Patented Dec. 20, 1949

2,491,642

UNITED STATES PATENT OFFICE 2,491,642

POLYVINYL ALCOHOL CASTING SOLUTION

Gilbert W. Brant, Buffalo, N. Y., assignor to E. I. du Pont de Nemours & Company, Wilmington, Del., a corporation of Delaware No Drawing. Application September 2, 1944, Serial No. 552,577

1 Claim. (Cl. 260—29.6)

This invention relates to the manufacture of films of polyvinyl alcohol, and more particularly to the stripping from the casting surface of sheets or films of polyvinyl alcohol formed by the dry-casting process.

The term "polyvinyl alcohol" appearing hereinafter is employed in its accepted trade sense and denotes the water-soluble types of partially saponified and fully saponified polyvinyl acetate.

In the formation of continuous films of soluble film-forming material such as polyvinyl alcohol, it is the conventional practice to flow a film of a solution of the film-forming material onto the casting surface, for example, a metal wheel or belt, cause the solvent to be substantially completely removed from the liquid film whereby to form a self-sustaining film, and to strip the resulting film from the casting surface.

In the formation of films of polyvinyl alcohol by a continuous casting process, the adhesion of the film to the casting surface has been a frequent source of difficulty. The film adheres so tenaciously to the metal casting surface that it is frequently broken or torn at the point of stripping. This action is especially troublesome at the edge of the film. Even when the film did not tear or break, distortion and deformation were quite common due to the high tension required for pulling the film away from the casting surface.

To overcome this difficulty, it has been proposed to incorporate stripping agents in the casting solution. However, when electrolytes are used for this purpose, they have a tendency to adversely modify the viscosity of the polyvinyl alcohol dope, and to promote corrosion of the casting surface. Moreover, it is generally necessary to employ such high amounts as to render the resulting film unsuitable for electrical use or for highly critical optical purposes.

An object of this invention, therefore, is the manufacture of strong, transparent, flexible polyvinyl alcohol sheets or films which are undeformed or unmarred, and which contain substantially no electrolytes.

A further object is the provision of means whereby the dried or partially dried film of polyvinyl alcohol may be readily stripped from a metal casting surface.

These and other objects will more clearly appear hereinafter.

It has been found that the above objects are accomplished by incorporating in the casting dope from which the film is cast, a small amount of an aqueous solution or dispersion of an alkylene oxide polymer (polyalkylene oxide).

The polyalkylene oxides used in the process of this invention may be prepared by any of the known methods, for example, by heating the monomeric oxide in the presence of a catalyst (e. g., an alkaline catalyst) if necessary under pressure until a substantial proportion of polymer is formed, and removing the unchanged monomer. The products, depending on their molecular weight, are solid, semi-solid, or even fluid materials which are soluble in both water and certain organic solvents such as benzene. These products are generally believed to be composed of a plurality of alkylene groups linked together in linear configurations through ether linkages which bear hydroxyl groups at the ends of the polymeric chain. Thus, polyethylene oxide is represented by HO—($CH_2CH_2O$—)$_n CH_2CH_2OH$. These polymers are sometimes called polyethylene glycols.

In general, the stripping agents useful for this invention comprise those formed by the polymerization or chain reaction of an alkylene oxide such, for example, as ethylene oxide, propylene oxide, butylene oxide, etc., such chain formation to extend to products with a molecular weight in the range of 400 to 5000. If desired, the polymeric alkylene oxide may be modified by incorporation of other organic radicals, for example, aliphatic acids, amines, hydroxylated materials such as glycerol, glycol ethers, etc.

Commercially prepared polyalkylene oxides, such as the materials produced by the Carbide and Carbon Chemicals Corporation under the trade name "Carbowax" are satisfactory for the process of this invention.

The following examples will serve to illustrate more clearly the invention. The parts and percentage compositions are by weight unless otherwise indicated.

Example I

A 15% aqueous solution of a substantially completely saponified polyvinyl alcohol was prepared at a temperature of 80° to 100° C. To different portions of the original solution was added polyethylene oxide (Carbowax, M. P. 35° C., approximate molecular weight 1500). Films were prepared from these solutions by casting the dope onto a clean, nickel-plated casting plate, maintained at a temperature of 60° C., and smoothing out the solution by means of a doctor knife. After drying, the stripping tensions required to remove the films from the casting surface were measured with the following results:

| Film | Carbowax | Stripping Tension |
|---|---|---|
| | Per cent | Grams |
| 1 | None | Over 2,000 |
| 2 | 0.038 | 70 |
| 3 | 0.075 | 60 |

All films measured 0.0013 inch thick. The films cast from solutions containing the polyethylene oxide were clear, flexible, and easily removed from the casting surface. They were substantially free from surface imperfections. In contrast to these, film (1) cast from the original solution and to which no stripping agent was added, was difficult to remove from the casting surface and was consequently distorted. It contained numerous surface imperfections.

To show the effect of incorporating a softener in the dope a solution similar in all respects to the solution described above, except that it contained 2.25% glycerol and 0.038% Carbowax-1500, was prepared. Film cast from this solution required a stripping tension of 230 grams. This film was much more pliable than films 2 and 3, and therefore required a slightly greater stripping tension. However, it was easily removed from the casting surface and possessed satisfactory surface characteristics.

The stripping tension values represent the force required to remove from the casting surface films measuring 7.5 inches wide and approximately 0.0013 inch thick. While the values shown are relative, rather than absolute, it is observed that the tension required to strip the film containing no stripping agent is many times greater than that required for the preferred mode of the invention.

*Example II*

To different portions of polyvinyl alcohol solution prepared as in Example I, varying amounts of polyethylene oxide (Carbowax, M. P. 50°–53° C., approximate molecular weight 4000) were added and films were prepared from these solutions by casting onto a chromium-plated casting surface maintained at a temperature of 60° C. The stripping tensions required to release these films were as follows:

| Percent Carbowax | Stripping Tension |
| --- | --- |
|  | Grams |
| None (Original solution) | Over 2,000 |
| 0.008% | 800 |
| 0.015% | 400 |
| 0.050% | 300 |
| 0.075% | 200 |

*Example III*

A 20% solution of polyvinyl acetate which was 83% saponified, was prepared at a temperature of 80°–100° C. Varying amounts of polyethylene oxide were added to different portions of this solution and the stripping tensions of films cast therefrom were measured with the following results:

| Percent Carbowax | Stripping Tension |
| --- | --- |
|  | Grams |
| None (Original solution) | Over 2,000 |
| 0.010% | 500 |
| 0.020% | 300 |
| 0.050% | 200 |
| 0.080% | 150 |
| 0.100% | 150 |

As the foregoing examples indicate, the polyethylene oxides preferred for use in this invention are those of approximate molecular weight of 1500 and 4000. However, polyalkylene oxides having higher and lower molecular weights may be used to advantage. The most useful range comprises polymers which are at least 4% soluble in water at 25° C. and which may vary in molecular weight from 400 to 5000, or in special cases polymers of molecular weight as great as 10,000 may be used.

The amount of polyethylene oxide suitable for production of high quality film, is in the range of 0.01% to 0.10% based on the weight of bath, although higher or lower amounts may be used if desired. Amounts as low as 0.005% will provide stripping tensions which permit the production of film of satisfactory quality. Amounts greater than, 0.10% may be used if desired although such amounts may not be economical.

The stripping agents of this invention may be incorporated in the casting dope in any desired manner. If preferred, they may be predissolved in solvents used for dissolving the final polyvinyl alcohol. Ordinarily they are incorporated into solvents simultaneously with the polyvinyl alcohol. In some instances, it has been found convenient to add the stripping agents to the solution of the polyvinyl alcohol.

The preferred concentration of the polyvinyl alcohol dope is in the range of 10% to 25%, although higher and lower concentrations may be used. In the commercial production of this film, the use of lower concentrations is unsatisfactory for the reason that lower casting speeds are necessary for the evaporation of the larger amount of water from the film. Concentrations of the polyvinyl alcohol greater than 25% are equally unsatisfactory because of their high viscosity.

While the polyethylene oxides are used to advantage in stripping film from a metal casting surface such as soft steel, stainless steel, plated steel, copper, or a nickel- or chromium-plated metal surface, the invention does not deny the use of other casting surfaces such as cloth, rubber or cellulosic materials such as regenerated cellulose. Likewise, the casting surface may be of any suitable structural design such as a wheel, drum or endless belt.

The invention is described, for convenience, in terms of casting a polyvinyl alcohol film, although it comprehends as well the casting of film of any polymeric water-soluble material. Other water-soluble film-formers useful in this invention are water-soluble varieties of polyvinyl acetals or butyrals, starch, and casein. Moreover, it is understood that the incorporation in the film-forming composition of plasticizing agents or softeners for the improvement of flexibility characteristics, the incorporation of dyes or other suitable coloring agents, moistureproofing agents, flameproofing agents, and insolubilizing agents such as formaldehyde, boric acid, etc., is not contrary to the spirit of the invention.

Of particular advantage arising from this invention is the continuous casting of polyvinyl alcohol films and the easy, speedy removal of such films from a metal casting surface. Film cast from the solutions of this invention possesses good clarity and is substantially free from surface imperfections. Moreover, the invention makes possible the production of films free from electrolytes and eminently suitable for highly critical electrical uses.

As many apparently widely different embodiments of this invention may be made without departing from the spirit and scope thereof, it is to be understood that this invention is not limited to the specific embodiments thereof except as defined in the appended claims.

I claim:

A solution capable of being dry-cast to form a solid self-sustaining film consisting of from 10% to 25% by weight of polyvinyl alcohol, water and as an agent to facilitate stripping of the film from a metal casting surface from 0.01% to 0.10% of a polyethylene oxide which is at least 4% soluble in water at 25° C. and which has a molecular weight within the range of 400 to 5000.

GILBERT W. BRANT.

REFERENCES CITED

The following references are of record in the file of this patent:

UNITED STATES PATENTS

| Number | Name | Date |
|---|---|---|
| 2,072,302 | Hermann | Mar. 2, 1937 |
| 2,176,903 | Izard | Oct. 24, 1939 |
| 2,239,718 | Izard | Apr. 29, 1941 |
| 2,300,074 | Strain | Oct. 27, 1942 |
| 2,324,601 | Spanagel | July 20, 1943 |